United States Patent
Wang et al.

(10) Patent No.: US 7,185,098 B2
(45) Date of Patent: Feb. 27, 2007

(54) CONFERENCING USING FLEXIBLE CONNECTION PORTS

(75) Inventors: Jian Wang, Bellevue, WA (US); Senthil K. Velayutham, Sammamish, WA (US); Lon-Chan Chu, Bellevue, WA (US); Armen Hovhannisyan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 10/262,497

(22) Filed: Sep. 30, 2002

(65) Prior Publication Data

US 2004/0064569 A1 Apr. 1, 2004

(51) Int. Cl.
*G06F 15/16* (2006.01)
(52) U.S. Cl. .................. 709/228; 709/204
(58) Field of Classification Search ........ 709/204–205, 709/227–228, 200–203, 217–226; 379/202.01
See application file for complete search history.

(56) References Cited

U.S. PATENT DOCUMENTS

| | | | | |
|---|---|---|---|---|
| 5,903,637 | A * | 5/1999 | Hogan et al. | 379/203.01 |
| 6,012,113 | A * | 1/2000 | Tuckner | 710/64 |
| 6,334,124 | B1 | 12/2001 | Bouchard et al. | 707/3 |
| 6,389,131 | B1 * | 5/2002 | Aquino et al. | 379/230 |
| 6,424,994 | B1 * | 7/2002 | Pirich et al. | 709/205 |
| 6,839,416 | B1 * | 1/2005 | Shaffer | 379/202.01 |
| 2002/0029276 | A1 | 3/2002 | Bendinelli | 709/227 |
| 2002/0107958 | A1 * | 8/2002 | Faraldo, II | 709/224 |
| 2002/0133611 | A1 * | 9/2002 | Gorsuch et al. | 709/231 |
| 2003/0135596 | A1 * | 7/2003 | Moyer et al. | 709/223 |
| 2003/0140124 | A1 * | 7/2003 | Burns | 709/220 |
| 2003/0185369 | A1 * | 10/2003 | Oliver et al. | 379/202.01 |
| 2004/0107255 | A1 * | 6/2004 | Ludwig et al. | 709/204 |

FOREIGN PATENT DOCUMENTS

| | | |
|---|---|---|
| EP | 0858201 | 8/1998 |
| WO | WO02/25451 | 3/2002 |
| WO | WO02/054706 | 7/2002 |

OTHER PUBLICATIONS

Brien L. Wheeler, News group Dec. 29, 1997, pp. 1-2.*
Security Considerations for Workflow Systems S. Li, A. Kittel, D. Jia and G; Zhuang, NOMS 2000. 2000 IEEE/IFIP Network Operations and Management Symposium "The Networked Planet: Management Beyond 2000" (Cat. No. 00CB37074), 2000, USA, pp. 655-668.

(Continued)

*Primary Examiner*—Moustafa M. Meky
(74) *Attorney, Agent, or Firm*—Perkins Coie LLP

(57) ABSTRACT

Performing conferencing without requiring communication using a specific connection port. A software module receives a function call from a conferencing application. The function call may include high-level instructions to perform a basic conferencing function, such as the communication of data from a specified buffer area. The software module then performs all of the details necessary in order to establish and maintain a connection with a conferencing server (or with one or more other participants in the case of peer-to-peer conferencing). While the conferencing application may be configured to optionally perform teleconferencing using a particular conferencing protocol and a particular conferencing connection port without the use of the software module, the software module may also be optionally used to establish, maintain, and exchanging conferencing information over an entirely different port when, for example, the usual conferencing connection port is not available.

19 Claims, 3 Drawing Sheets

OTHER PUBLICATIONS

An Mbone Proxy for an Application Gateway Firewall K. Djahandari and D.E. Sterne, Proceedings. 1997 IEEE Symposium on Security and Privacy (Cat. No. 97CB36097) Publ. by IEEE Comput. Soc. Press, Los Alamitos, CA, USA, pp. 72-81.

The Government Direct Initiative, C. Muid, ICA Information, Publ. by Int. Council Inf. Technol. Gov. Adm, Oct. 1997, UK, No. 63, pp. 289-291.

* cited by examiner

CONFERENCING USING FLEXIBLE CONNECTION PORTS

THE FIELD OF THE INVENTION

The present invention relates to network conferencing, and more particularly, to mechanisms for allowing conferencing over networks without having to open extra connection portions or requiring network connections using any specific connection port.

RELATED TECHNOLOGY

Computing technology has transformed the way we work and play. Modern computer networking technologies and infrastructures allow for different applications and users to communicate data electronically even over vast distances relatively quickly using readily-available computing systems. Such computing systems may include, for example, desktop computers, laptop computers, Personal Digital Assistants (PDAs), digital telephones, or the like.

Currently, computing systems are so interconnected that one computing system is literally capable of communicating with any one of many millions of other computing systems spread throughout the globe. One useful application that takes advantage of this interconnectivity is called conferencing. In the following description and in the claims, a "conference" is defined as a network session in which two or more participants exchange multimedia information in real-time regarding a topic of common interest. Such multimedia data may include data that represents any video, image, or sound information. The image may be, for example, an electronic representation of a blackboard, wherein when one participant writes on the blackboard using an input device, all participants in the conference may view what is written in real-time. In this description and in the claims, "to conference" or "conferencing" means that act of engaging in a conference as defined above. Some common types of conferencing protocols include, for example, Real-Time Transport Protocol (RTP), T.120, H.323, H.324, SIP, MGCP, and MEGACO. In the following description and in the claims, an "express conferencing protocol" means any of these expressly listed conferencing protocols.

Typically, the exchange of conferencing information using a conferencing protocol involves the exchange of multimedia data over a specifically assigned network port. For example, TCP port 1503 is conventionally used in some products for the exclusive exchange of multimedia conferencing data. Other ports are used for other non-conferencing protocols. For example, TCP port 80 is assigned for communication using HyperText Transport Protocol (HTTP), which is a common request/response protocol used for communicating over networks such as the Internet. In addition, TCP port 443 is assigned for communication for a secure version of HTTP called HTTPS.

One problem with conventional conferencing protocols is precisely that a given conferencing protocol often requires communication over a specific port. However, there may be reasons why that specific connection port may not be available. For example, the T.120 conferencing protocol uses TCP port 1503. However, some firewalls do not accept connections using that port due to security reasons. Accordingly, a conference participant cannot rely on the ability to conference through a firewall in all cases. Accordingly, what is desired are methods, systems, and computer program products for conferencing without requiring a connection over a particular port. Accordingly, a new port need not in all cases be opened when a conference is to be engaged in.

BRIEF SUMMARY OF THE INVENTION

The principles of the present invention relate to mechanisms for performing data conferencing without requiring communication using a specific connection port. The invention may be implemented by a software module that receives a function call from a conferencing application. The function call may include high-level instructions to perform a basic conferencing function, such as the communication of data from a specified buffer area.

The software module then performs all of the details necessary in order to establish and maintain a connection with a conferencing server (or with one or more other participants in the case of peer-to-peer conferencing). While the conferencing application is configured to optionally perform teleconferencing using a particular conferencing protocol and thus using a particular conferencing connection port without the use of the software module, the software module may also be optionally used to establish, maintain, and exchanging conferencing information over an entirely different port.

In one example implementation, the conferencing protocol is T.120, which typically requires a connection with a conferencing server over TCP port 1503. However, the software module (after determining that TCP port 1503 is not available) may take control of the exchange of conferencing information by signaling its control to the conferencing application, then establishing a connection over a different port such as TCP port 80 or TCP port 443, then packaging the conferencing information using a protocol (such as HTTP or HTTPS) appropriate for the different port (such as port 80 or port 443, respectively), and then communicating the newly packaged information over the established connection.

Accordingly, even if communication over a particular part (such as TCP port 1503) was barred by a firewall, conferencing may still occur over another port for which the firewall does accept connection requests. Furthermore, the software module that performs the connection may also resolve any other connection issues such as whether there is a proxy, and how should communications be negotiated through that proxy. The software module may also perform other tasks such as encryption of outgoing conferencing data and decryption of incoming conferencing data. When conference data is received using a particular protocol, the software module extracts the conferencing information, and then presents it to the conferencing application in a format that the conferencing application may interpret.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to methods, systems and computer program products for performing conferencing without requiring a connection over a specific conferencing connection port. The invention may be implemented in an environment in which a conferencing client exchanging conferencing information with a conferencing server. The conferencing client includes a conferencing application that places a function call to a software module. The software module causes a connection to be established with the conferencing server over a connection port other than the conferencing connection port. The software module then fulfills the function call using the connection port other than the conferencing connection port.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
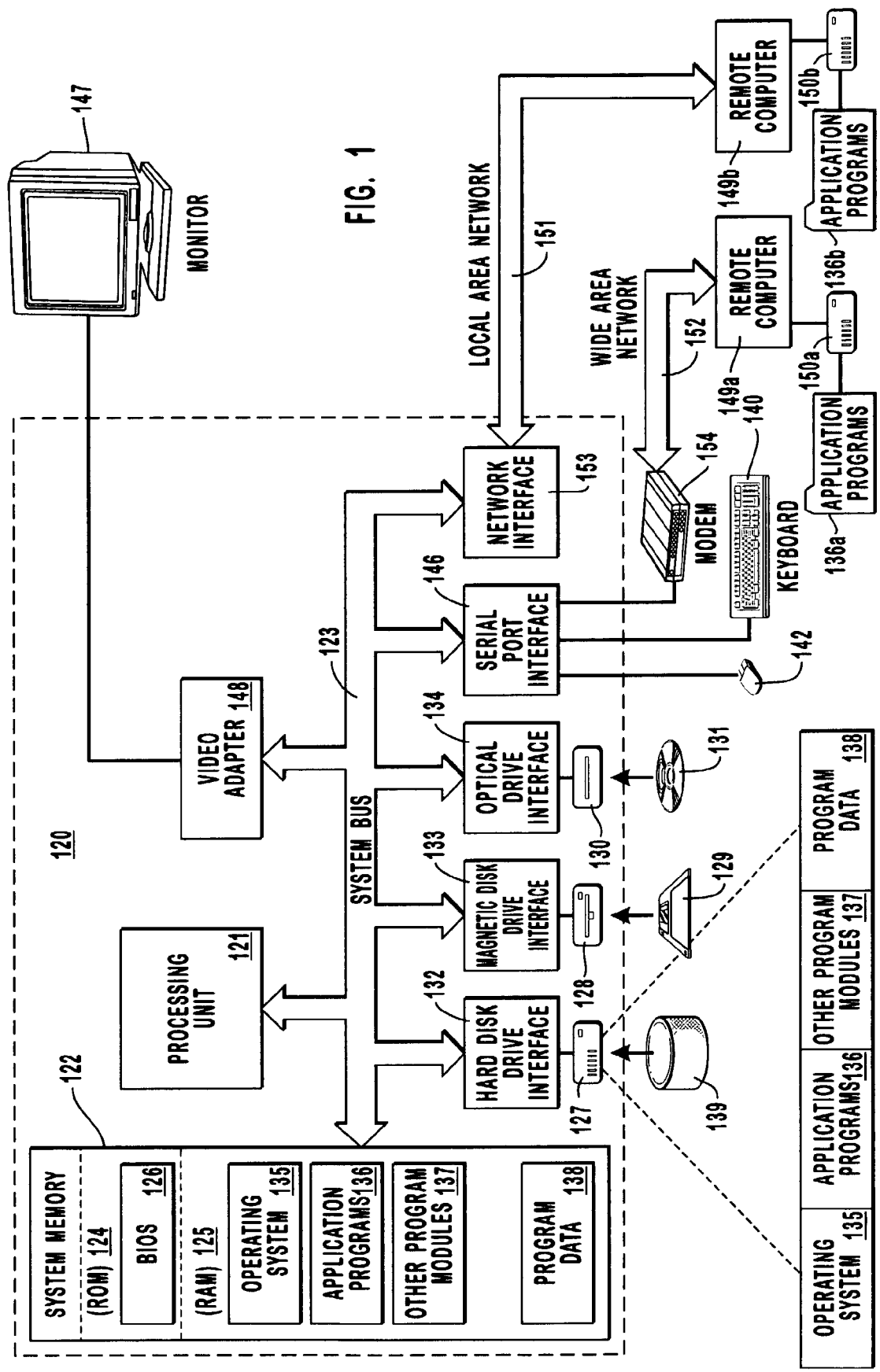
FIG. 1 illustrates a suitable computing system in which the principles of the present invention may be employed.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, and the like, that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 2:
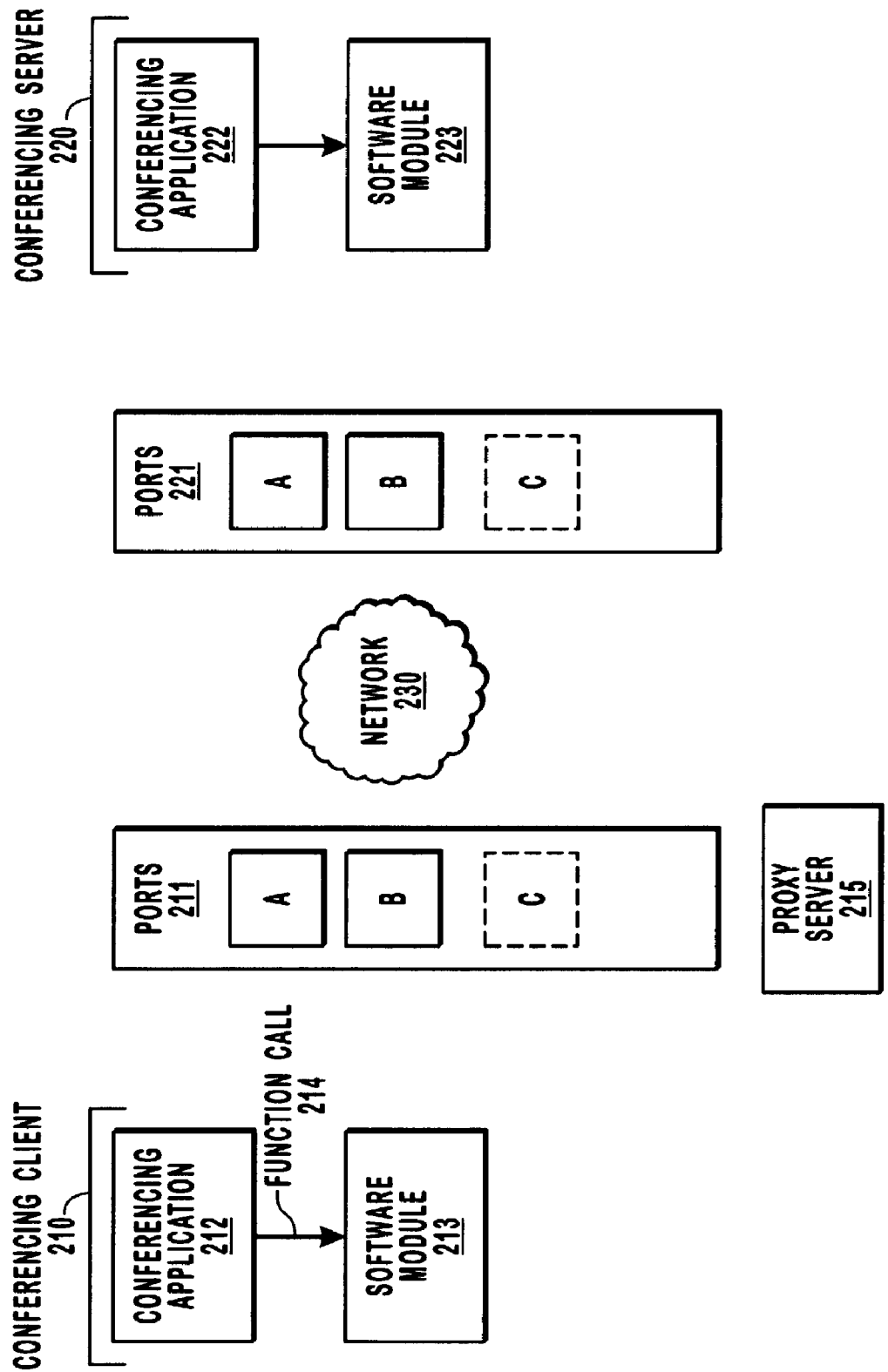
FIG. 2 illustrates a network environment in which the principles of the present invention may be employed.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. Throughout this description, element numbers begin with the same number as the figure in which the corresponding elements were first introduced. For example, all of the element numbers in FIG. 1 are numbered in the 100's while the element numbers in FIG. 2 are number in the 200's, and so forth.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 46 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 illustrates an example of a computing system that may implement the principles of the present invention, any computing system may implement the features of the present invention. In the description and in the claims, a "computing system" is defined as any hardware component or components that are capable of using software to perform one or more functions. Examples of computing systems include desktop computers, laptop computers, Personal Digital Assistants (PDAs), telephones, or any other system or device that has processing capability.

FIG. 2 illustrates a network environment in which the principles of the present invention may be employed. The network includes a conferencing client 210 in communication with a conferencing server 220. The conferencing client and server may be any computing system. One is labeled as a "client" and one as a "server" merely to distinguish one computing system from the other. The conferencing client 210 and the conferencing server 220 may, for purposes of this description and in the claims, be peer computing systems.

The conferencing server 220 may communicate with the conference client 210 over a network 230 such as, for example, the Internet. The conferencing server 220 may communicate, directly or indirectly, with yet other conferencing clients to thereby enable multi-participant conferencing between conferencing clients.

The conferencing client 210 and the conferencing server 220 may communicate after establishing a connection. Connections may be established over a network such as the Internet by requesting and establishing a connection with a particular port present on a remote computing system. For example, the conferencing client 210 may potentially communicate with the conference server 220 using one of the connections ports 221. Connection ports A and B of the connection ports 221 are allowed as symbolized by the associated boxes having solid border lines. Accordingly, in-coming connection requests to these ports A and B will be honored by the conferencing server 220. Conversely, connection port C of the connection ports 221 is disallowed as symbolized by the associated boxes having dashed border lines. Accordingly, in-coming connection request to port C will be rejected by the conferencing server 220.

The conferencing client 210 may also have connection ports 211 having ports A and B being allowed, and port C being disallowed. The conferencing server 220 may communicate with the conferencing client 220 using one of the connection ports 211. In one embodiment, port A represents TCP port 80 used by HyperText Transport Protocol (HTTP), port B represents TCP port 443 used by a secure form of HTTP called HTTPS, and port C represents TCP port 1503 used to communicating real-time conferencing information using T.120.

What determines what ports are allowed and disallowed for a given computing system may be determined by configuration settings of the computing system itself, or perhaps by a configuration setting of a firewall that protects the computing system. The elements 211 and 221 of FIG. 2 may also represent associated firewalls that allow/disallow connection requests to the included ports. For example, many firewalls are configured to accept connection requests through TCP port 80 and 443, which correspond to HTTP and HTTPS protocols, respectively. However, conferencing protocols such as, for example, T.120, use TCP port 1503, which many firewalls disallow for security reasons. If TCP port 1503 was disallowed for one reason or another, conferencing using that port would be impossible. The principles of the present invention allow for the conferencing client 210 to conference with the conferencing server 220 even if an intervening firewall disallowed connections over TCP port 1503 or any other conferencing connection port for that matter.

The conferencing client 210 includes a conferencing application 212, such as NetMeeting®, that is configured to communicate over communication port C (e.g., port 1503). The conferencing server 220 may also include a conferencing application 222 that is configured to communicate over disallowed communication port C. The conferencing applications 212 and 222 represent examples of the application programs 136 shown in FIG. 1. Since connection port C is disallowed, conferencing client 210 and conferencing server 220 would not normally be able to conference without changing configuration settings so as to permit communication over conferencing connection port C. However, as will now be described in further detail, the principles of the present invention allow the conferencing client 210 to communicate with the conferencing server 220 regardless of whether the conferencing connection port C is available.

To accomplish this, the conferencing client 210 includes a software module 213, which may be, for example, the application programs 136, or one of the software modules 137 described above with respect to FIG. 1. The conferencing server 220 may also include a software module 223. The software module 213 may be, for example, an ActiveX® module that is downloaded from the conferencing server 220 to the conferencing client 210 the first time the conferencing client 210 navigates to the conferencing server 220 for the purposes of scheduling or accepting an invitation to a conference. The software module 213 may function as described below with respect to the flowchart of FIG. 3.

Figure 3:
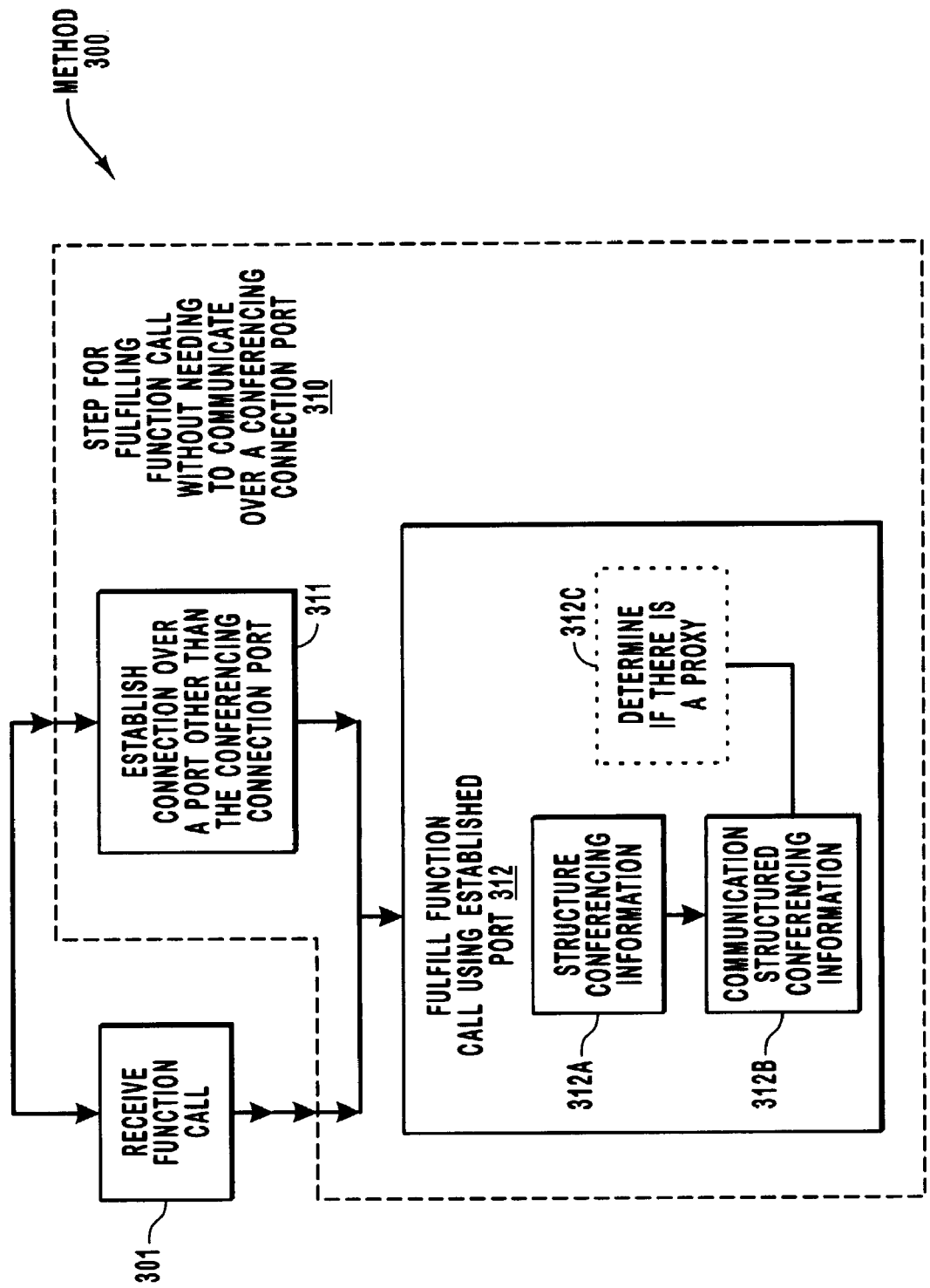
FIG. 3 is a flowchart of a method for conferencing in accordance with the present invention.

FIG. 3 illustrates a method 300 for conferencing without requiring communication over a conference connection port. The method 300 includes an act of the software module 213 receiving a function call 214 from the conferencing application 212 (act 301). The function call 214 may be a function call to communicate conferencing information such as data, video, image and/or audio information. While the conferencing application 212 is configured to communicate with the conferencing server 220 using a data conferencing protocol such as a real-time data conferencing protocol over a particular conferencing port, in cases where such conferencing is not possible, the software module 213 may be relied upon to perform the details of data conferencing without requiring communication using a particular conferencing port.

Accordingly, the method 300 includes a step (step 310) for fulfilling the function call without needing to communicate over the conferencing connection port. This functional, result-oriented step may include any corresponding acts for accomplishing this result. However, in FIG. 3, step 310 is illustrates as including corresponding acts 311 and 312. Particularly, the software module 213 causes a connection to be established with the conferencing server 220 over a connection port other than the conferencing connection port (act 311). In one example, the software module 213 causes a connection to be established over port A (e.g., TCP port 80) or over port B (e.g., TCP port 443). The software module 213 then fulfills the function call using the connection port other than the conferencing connection port (act 312).

In order to fulfill the function call (act 312) in a case in which the function call designates that conferencing information is to be exchanged with the conference server, the software module 213 structures the conferencing information (act 312A) to allow for communication of the conferencing information over the connection port A or B. For example, the software module B may taken conferencing information that is structured as appropriate for a NetMeeting or RTP request, and then structure that information into an HTTP or HTTPS request. The software module then communicating the structured conferencing information with the conferencing server (act 312B). Optionally, as represented by dotted box 312C, the software module may also determine whether there is a proxy server (e.g., such as proxy server 215) between the conferencing client 210 and the conferencing server 220. In that case, the act of communicating the structured conferencing information with the conferencing server 312B may include an act of communicating the structured conferencing information through the proxy server 215. The software module 213 may also encrypt conferencing information to be sent or decrypt conferencing information to be received.

Accordingly, the principles of the present invention allow for conferencing information to be exchange even without requiring a conferencing connection port. Instead, any one of a number of other connection ports may be used. This represents a significant advance in the state of conferencing since the circumstances for each conference participant may vary widely. Some may have proxy servers and/or only be able to communicate over a limited number of ports that do not including a conferencing connection port, while others may not have proxy servers and may be able to communicate over a connection port. The principles of the present invention accommodate circumstances in which a proxy server may be available, and in which communication over a conferencing connection port may not be an option. In one embodiment, the software module 213 undertakes to establish a connection port over a non-conference connection port (such as TCP port 80 or 443) only after it has been determined that conferencing over a conference connection port (such as TCP port 1503) is not available.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a network environment that includes a conferencing client and a conferencing server, the conferencing client having a conferencing application that is configured to communicate with the conferencing server using a conferencing protocol, the conferencing protocol requiring communication over a required conferencing connection port, a method for the conferencing client conferencing with the conferencing server without using a connection over the required conferencing connection port, the method comprising the following:

an act of a software module executing on the conferencing client receiving a function call from the conferencing application;

an act of determining whether the required conferencing connection port is available;

an act of the software module, when it is determined that the required conferencing connection port is not available, causing a connection to be established with the conferencing server over a connection port other than the required conferencing connection port, the connection port other than the required conferencing connection port having a protocol other than the conferencing protocol;

an act of structuring conferencing information in accordance with the conferencing protocol, the structured conferencing information being further structured in accordance with the protocol other than the conferencing protocol to allow for communication of the conferencing information over the connection port other than the required conferencing connection port; and an act of the software module fulfilling the function call using the connection port other than the required conferencing connection port.

2. A method in accordance with claim 1, wherein the act of the software module causing a connection to be established occurs in response to the act of the software module receiving a function call from the conferencing application.

3. A method in accordance with claim 1, wherein the required conferencing connection port is port 1503.

4. A method in accordance with claim 3, wherein the connection port other than the required conferencing connection port is port 80.

5. A method in accordance with claim 3, wherein the connection port other than the required conferencing connection port is port 443.

6. A method in accordance with claim 3, wherein the conferencing application is NetMeeting.

7. A method in accordance with claim 1, wherein the connection port other than the required conferencing connection port is port 80.

8. A method in accordance with claim 1, wherein the connection port other than the required conferencing connection port is port 443.

9. A method in accordance with claim 1, wherein the conferencing application is NetMeeting.

10. A method in accordance with claim 1, wherein the act of the conferencing client fulfilling the function call using the connection port further comprises the following:
an act of communicating the structured conferencing information with the conferencing server.

11. A method in accordance with claim 10, further comprising the following:
an act of the software module determining whether there is a proxy server between the conferencing client and the conferencing server, wherein the act of communicating the structured conferencing information with the conferencing server comprises an act of communicating the structured conferencing information through the proxy server.

12. A method in accordance with claim 1, wherein the conferencing protocol is an express conferencing protocol.

13. A method in accordance with claim 12, wherein the express conferencing protocol comprises NetMeeting.

14. A method in accordance with claim 12, wherein the express conferencing protocol comprises Real-Time Transport Protocol.

15. A computer program product for use in a network environment that includes a conferencing client and a conferencing server, the conferencing client having a conferencing application that is configured to communicate with the conferencing server using a conferencing protocol, the conferencing protocol requiring communication over a required conferencing connection port, the computer program product for implementing a method for the conferencing client conferencing with the conferencing server without using a connection over the required conferencing connection port, the computer program product comprising one or more computer-readable media having thereon the following:
computer-executable instructions for detecting receipt of a function call from the conferencing application;
computer-executable instructions for determining whether the required conferencing connection port is available;
computer-executable instructions for, when it is determined that the required conferencing connection port is not available, causing a connection to be established with the conferencing server over a connection port other than the required conferencing connection port, the connection port other than the required conferencing connection port having a protocol other that the conferencing protocol;
computer-executable instructions for structuring conferencing information in accordance with the conferencing protocol, the structured conferencing information being further structured in accordance with the protocol other than the conferencing protocol to allow for communication of the conferencing information over the connection port; and
computer-executable instructions for fulfilling the function call using the connection port other than the required conferencing connection port.

16. A computer program product in accordance with claim 15, wherein the one or more computer-readable media are physical storage media.

17. A computer program product in accordance with claim 15, wherein the computer-executable instructions for causing a connection to be established are configured to be executed in response to execution of the computer-executable instructions for detecting receipt of a function call.

18. A computer program product in accordance with claim 15, wherein the computer-executable instructions for fulfilling the function call using the connection port further comprise the following:
computer-executable instructions for communicating the structured conferencing information with the conferencing server.

19. A computer program product in accordance with claim 15, wherein the one or more computer-readable media further have thereon the following:
computer-executable instructions for determining whether there is a proxy server between the conferencing client and the conferencing server, wherein the computer-executable instructions for communicating the structured conferencing information with the conferencing server comprise computer-executable instructions for communicating the structured conferencing information through the proxy server.

* * * * *